United States Patent
Egan et al.

(10) Patent No.: US 9,503,532 B2
(45) Date of Patent: Nov. 22, 2016

(54) REDISCOVERY OF PAST DATA

(71) Applicant: Western Digital Technologies, Inc., Irvine, CA (US)

(72) Inventors: Michael F. Egan, Mountain View, CA (US); Scott A. Rader, Irvine, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 217 days.

(21) Appl. No.: 14/099,720

(22) Filed: Dec. 6, 2013

(65) Prior Publication Data

US 2015/0067049 A1 Mar. 5, 2015

Related U.S. Application Data

(60) Provisional application No. 61/873,296, filed on Sep. 3, 2013.

(51) Int. Cl.
*G06F 15/16* (2006.01)
*H04L 29/08* (2006.01)

(52) U.S. Cl.
CPC .............. *H04L 67/18* (2013.01); *H04L 67/22* (2013.01); *H04L 67/26* (2013.01)

(58) Field of Classification Search
CPC ........ H04L 67/18; H04L 67/22; H04L 67/26
See application file for complete search history.

(56) References Cited

U.S. PATENT DOCUMENTS

| | | | |
|---|---|---|---|
| 6,499,054 B1 | 12/2002 | Hesselink et al. | |
| 6,731,316 B2 | 5/2004 | Herigstad et al. | |
| 6,732,158 B1 | 5/2004 | Hesselink et al. | |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |
| 8,004,791 B2 | 8/2011 | Szeremeta et al. | |
| 8,255,661 B2 | 8/2012 | Karr et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,358,358 B2 * | 1/2013 | Gallagher | G06F 17/30265 348/231.2 |
| 8,447,331 B2 | 5/2013 | Busch | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |

(Continued)

OTHER PUBLICATIONS

International Search Report and Written Opinion dated Dec. 10, 2014 from related PCT Serial No. PCT/US2014/053752, 13 pages.

*Primary Examiner* — Moustafa M Meky
(74) *Attorney, Agent, or Firm* — Young Law Firm, P.C.

(57) ABSTRACT

According to one embodiment, a user's past content (e.g., pictures, movies, audio recordings) may be retrieved and pushed to the user's mobile device in a real-time and in a contextually-relevant manner. The pushed content may also include contextually-relevant content of others with whom the user has established a relationship to share such content.

23 Claims, 5 Drawing Sheets

(56) References Cited

U.S. PATENT DOCUMENTS

| | | | |
|---|---|---|---|
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,788,587 B2* | 7/2014 | Balassanian | G06F 15/17306 709/204 |
| 8,793,374 B2 | 7/2014 | Hesselink et al. | |
| 8,819,443 B2 | 8/2014 | Lin | |
| 8,947,547 B1* | 2/2015 | Millikan | H04N 1/00156 348/211.1 |
| 9,055,276 B2* | 6/2015 | Parulski | H04N 5/232 |
| 9,223,783 B2* | 12/2015 | Doyle | G06F 17/30038 |
| 2003/0186708 A1 | 10/2003 | Parulski et al. | |
| 2005/0144195 A1 | 6/2005 | Hesselink et al. | |
| 2005/0144200 A1 | 6/2005 | Hesselink et al. | |
| 2006/0217990 A1 | 9/2006 | Theimer et al. | |
| 2007/0174490 A1 | 7/2007 | Choi et al. | |
| 2008/0070593 A1* | 3/2008 | Altman | H04L 63/102 455/457 |
| 2008/0227435 A1 | 9/2008 | Six et al. | |
| 2009/0037515 A1 | 2/2009 | Zapata et al. | |
| 2009/0092378 A1 | 4/2009 | Ho et al. | |
| 2009/0234876 A1* | 9/2009 | Schigel | G06F 17/30873 |
| 2009/0299725 A1 | 12/2009 | Grigsby et al. | |
| 2010/0182341 A1* | 7/2010 | Lee | G06F 17/30044 345/635 |
| 2010/0325194 A1* | 12/2010 | Williamson | H04W 4/02 709/203 |
| 2011/0083101 A1 | 4/2011 | Sharon et al. | |
| 2011/0099478 A1* | 4/2011 | Gallagher | G06F 17/30265 715/735 |
| 2012/0036041 A1 | 2/2012 | Hesselink | |
| 2012/0109752 A1* | 5/2012 | Strutton | G06Q 30/0261 705/14.58 |
| 2012/0315881 A1 | 12/2012 | Woloshyn | |
| 2013/0042177 A1 | 2/2013 | Dunko | |
| 2013/0083364 A1 | 4/2013 | Gaucas et al. | |
| 2013/0083977 A1 | 4/2013 | Jackson | |
| 2013/0094538 A1* | 4/2013 | Wang | H04B 1/707 375/141 |
| 2013/0095855 A1 | 4/2013 | Bort | |
| 2013/0125031 A1 | 5/2013 | Calica et al. | |
| 2013/0212401 A1 | 8/2013 | Lin | |
| 2013/0266137 A1 | 10/2013 | Blankenbeckler et al. | |
| 2013/0268413 A1* | 10/2013 | Burr | G06Q 30/06 705/27.1 |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2013/0276134 A1* | 10/2013 | Meredith | G06F 21/00 726/27 |
| 2013/0316726 A1* | 11/2013 | Laws | H04W 4/02 455/456.1 |
| 2014/0095439 A1 | 4/2014 | Ram | |
| 2014/0100995 A1* | 4/2014 | Koshy | G06Q 30/0643 705/27.2 |
| 2014/0129640 A1* | 5/2014 | Ogawa | H04L 67/306 709/204 |
| 2014/0162685 A1* | 6/2014 | Edge | H04W 4/023 455/456.1 |
| 2014/0169921 A1 | 6/2014 | Carey | |
| 2014/0173215 A1 | 6/2014 | Lin et al. | |
| 2014/0206317 A1* | 7/2014 | Casey | G01C 21/20 455/411 |
| 2014/0287723 A1* | 9/2014 | LaFever | H04W 12/02 455/411 |
| 2014/0310366 A1* | 10/2014 | Fu | H04L 51/04 709/206 |
| 2015/0058749 A1* | 2/2015 | Hwu | H04L 67/18 715/753 |
| 2015/0065172 A1* | 3/2015 | Do | H04L 63/107 455/456.3 |
| 2015/0127939 A1* | 5/2015 | Mazandarany | H04L 9/32 713/168 |
| 2015/0172393 A1* | 6/2015 | Oplinger | H04L 67/10 709/204 |

* cited by examiner

REDISCOVERY OF PAST DATA

CROSS-REFERENCE TO RELATED APPLICATIONS

This application claims benefit of U.S. Provisional Patent Application Ser. No. 61/873,296 entitled "REDISCOVERY OF PAST DATA," filed Sep. 3, 2013, the disclosure of which is incorporated by reference herein in its entirety.

BACKGROUND

Many people have thousands of old pictures and movies stored on various storage devices. If they are organized at all, they may be organized by date, place or event. However, even if organized by place, the pictures and/or movies usually cover a set period of time (e.g., Tahoe Vacation, August 2011). Metadata such as time and date and geo-tags may be stored along with content. For example, it is known to annotate a map with pictures and movies that were previously taken at various points on a map.

Often, pictures and movies languish in storage, only seldom re-visited—and only upon the user deciding to look through old pictures and movies. However, no methods or services have been available to enable the user to re-discover content such as old movies, recordings, pictures, and the like.

DETAILED DESCRIPTION

Figure 1:
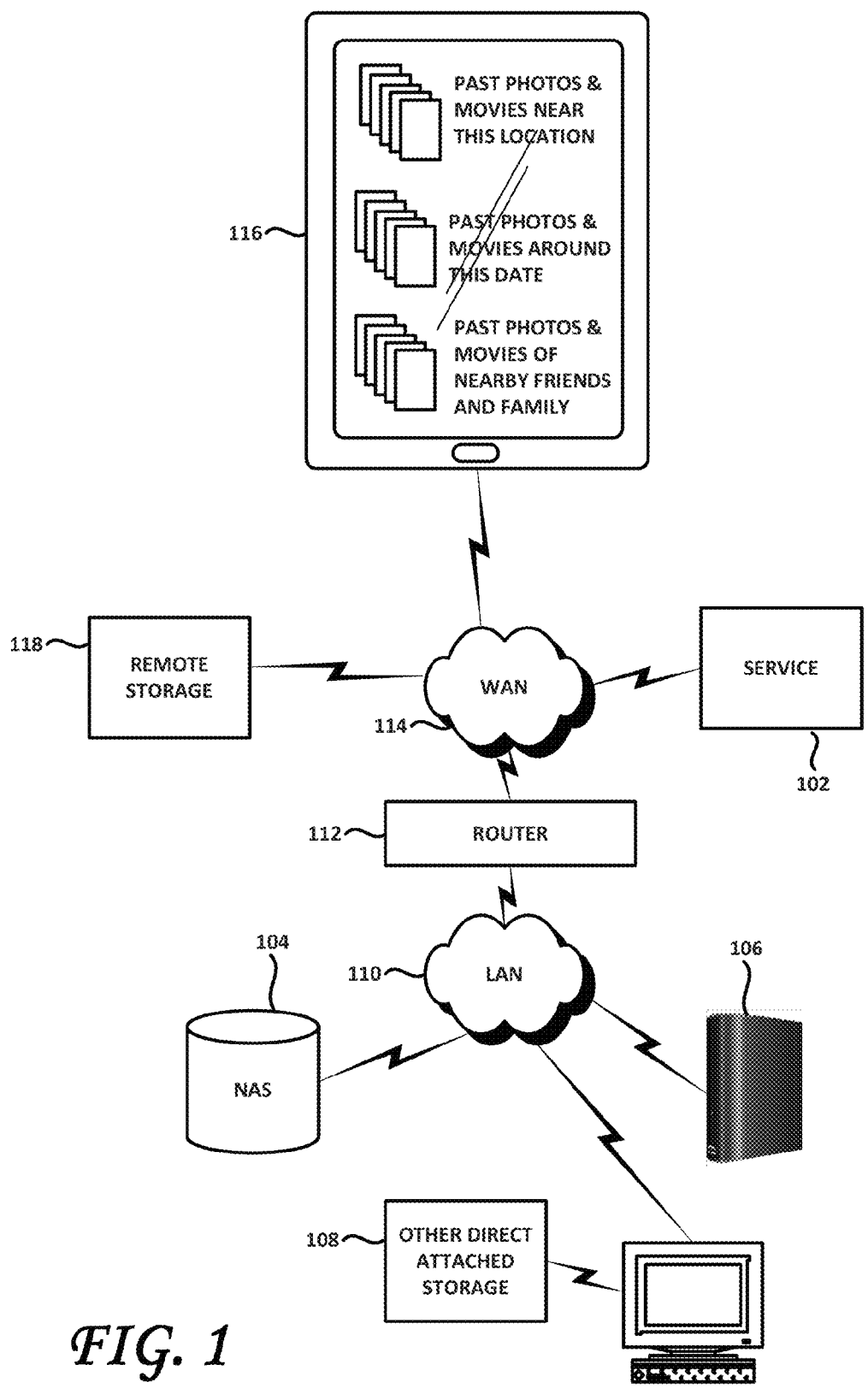
FIG. 1 is a block diagram of a system for the re-discovery of past data, according to one embodiment.

According to one embodiment, a user's past pictures/movies or other content may be retrieved and pushed to the user's mobile device and/or to another user's mobile device in a real-time and in a contextually-relevant manner. Depending upon the current location of the user, or who the user is with, what the date is or what event is occurring, selected photographs, videos or audio content (collectively hereafter, "content") associated with those places, dates, people and/or events may be retrieved from a user's Network Attached Storage (NAS) and/or other storage that is accessible to a network and pushed to a mobile device. According to one embodiment, an application on the user's mobile device and/or the user's NAS may have awareness of place, people, time and/or events and may search or cause a search to be made, of the user's NAS, other connected Direct Attached Storage (DAS) and/or memory internal to the mobile device to select appropriate content to push to and/or render on the user's mobile device.

According to one embodiment, the user may then be presented selected contextually-relevant content (e.g., pictures, audio content or movies), in real or near-real time. The selected contextually-relevant content may belong to another person or may belong to the user. In use, embodiments may be configured to present content to the user that the user may not have seen in a long time but that are, nevertheless, highly relevant to the user's current or past (or even future anticipated) circumstances. According to one embodiment, the content presented may have been originally generated by others, such as friends with whom the user has previously established a relationship to enable the selective sharing of selected content. According to another embodiment, the content may be the user's own, whether such content is locally or remotely (e.g., network accessible) content.

One embodiment comprises an application that may leverage the user's personal cloud—that is, the totality of the user's available storage such as, for example, on the user's NAS, other DAS devices, online storage services, local memory and the like. The application may be configured to be aware of the user's current location, the current time, date and, according to one embodiment, of other users that are in the user's vicinity. According to one embodiment, the application also may be configured to be aware of other user(s) that may have, in the past, been in the user's current vicinity.

According to one embodiment, the application may be configured, based on, for example, the user's current geographical location, the current date and time and/or other close-by users, an event (e.g., an automobile race or a birthday party), the date of the event, participants in the event, season of the event, nature of the event and/or duration of the event (among a myriad other possible factors) to push to the user's mobile devices content that is relevant to the user's circumstances right now.

For example, suppose the user is on vacation at Tahoe in July. The user's friends, Alice and Bob, are also there, unbeknownst to the user. Alice and Bob, according to one embodiment, may have previously established a relationship with the user and may have enabled (e.g., affirmatively authorized) selected content (e.g., photos, audio files and/or videos that are relevant to the user) to be shared with the user. One embodiment may then search the user's storage devices (including the user's mobile device, NAS and DAS), and push past pictures or other content of the user and the user's family at Tahoe, and/or pictures or other content of the user taken in the month of July in preceding years. The application may also, according to one embodiment, push content (from the user's store of such photos) containing Alice and Bob visiting the user during past Tahoe vacations, for example. The application, according to one embodiment, may also selectively push selected content retrieved from Alice or Bob's NAS or other network-accessible mass storage to the user's mobile device. The content pushed to the user' mobile device may not feature the user, Alice or Bob. For example, a scenery photograph of Lake Tahoe, taken by Alice this time last year, may also be pushed to the user's mobile device. Tags accompanying the pushed content may provide the user with additional information identifying, for example, the time, place, people or event associated with the pushed content.

In this manner, relevant past content may be pushed to the user depending upon where the user is, the current date, with whom the user is and/or other selectable parameters. Controls may be established to exclude unwanted content that otherwise satisfies the selectable parameters, to control the age of the pictures presented, the topic, the nature (e.g., audio, photo or video) among other possibilities. The result is that the user may be presented with selected content that the user has not specifically requested. Such pushing of content may be carried in such a manner that the user instantly recognizes the relevance of the presented content, based upon his or her location, the time of day or year, the current event and/or other situational clues that may be perceptible or derivable by the user's mobile device and/or NAS or other network-accessible storage server. According to one embodiment, the photos/movies/other content may be pushed to the user's mobile device without any per-instance action on the part of the user, apart from an initial general opt-in or express permission for such content to be pushed to his or her mobile device. The user may peruse the presented content or dismiss the content at will. One embodiment enables the presented content to be shared at will. It is to be understood that, rather than pushing content to the mobile device, the mobile device may be configured to select and to pull the selected content from one or more NASs or other network-accessible storage or may be configured to pull content that is selected by a NAS or other network accessible storage.

In this manner, embodiments allow the user to re-discover his or her own content, which may be inherently valuable to the user. Embodiments may also allow users to discover or re-discover relevant content generated by other selected users with whom the user has a relationship, which may also be inherently valuable or at least contextually relevant to the user's present circumstances.

FIG. 1 is a block diagram of a system according to one embodiment. FIG. 1 shows an online service 102 with which the user may register to gain access to the content of their personal NAS 104 as well as, according to embodiments, other network-connected DAS devices as shown at 106 and 108 and/or remote, network-accessible storage 118, collectively, the "user-accessible storage"), through, for example, a Local Area Network (LAN) 110 and a router 112. For example, the user may use his or her mobile device 116 to call up a mobile or web application that may be configured to retrieve selected user-accessible content from one or more of the aforementioned sources and to post (e.g., push) the retrieved content on the user's mobile device. The mobile device 116 may operate on the LAN or a Wide Area Network (WAN) such as, for example, the Internet and may move from one to the other at different times. The selection of such content may be carried out based upon one or more parameters that may be collected by the user's mobile device and/or from the service 102. The service 102 may include, for example, a social networking application or service. For example, if the user has enabled location services on his or her mobile device, the service 102 may already "know" the location of the user and the current date and time of day at the user's current location. The service 102 may then retrieve user-accessible content or direct that the user's NAS do so, filter the available content according to the location and date/time and/or any number of other parameters and cause the filtered user-accessible content to be pushed or otherwise made available to the mobile application running on the user's mobile device. Other parameters may be defined as well. For example, an "event" may have been defined such as, for example, "Summer Vacation" or "Birthday" by the user. Should the user currently be located back where he or she spent a previous summer vacation, the value of other parameters may be established and used for filtering user-accessible content. For example, parameters related to time and date may be defined such as, for example, (between "June and August of the past 3 years") and/or other past similar events (prior BBQ nights with Harry and Sally). Such events may be defined by the user or automatically defined in a contextually-relevant manner using, for example, Global Positioning Satellite (GPS) data to pinpoint the user's location and the past or present location of others (such as at a specific restaurant or football stadium, for example).

Moreover, parameters may be defined to enable the selection of content generated by others with whom the user sets up or has set up a relationship. According to one embodiment, a relationship may be defined as an authorization, by the content owner, for the user to access or have access to (e.g., share) selected user-accessible content of the content owner. In this manner, if the user has previously established a relationship with Harry and Sally, contextually (location, time, date, people and/or event) relevant content may be retrieved from, for example, Harry and Sally's network-accessible storage (their NAS, for example) and pushed or otherwise presented or made available to the user in manner that the user may intuitively recognize as being relevant to his or her present situation.

Figure 2:
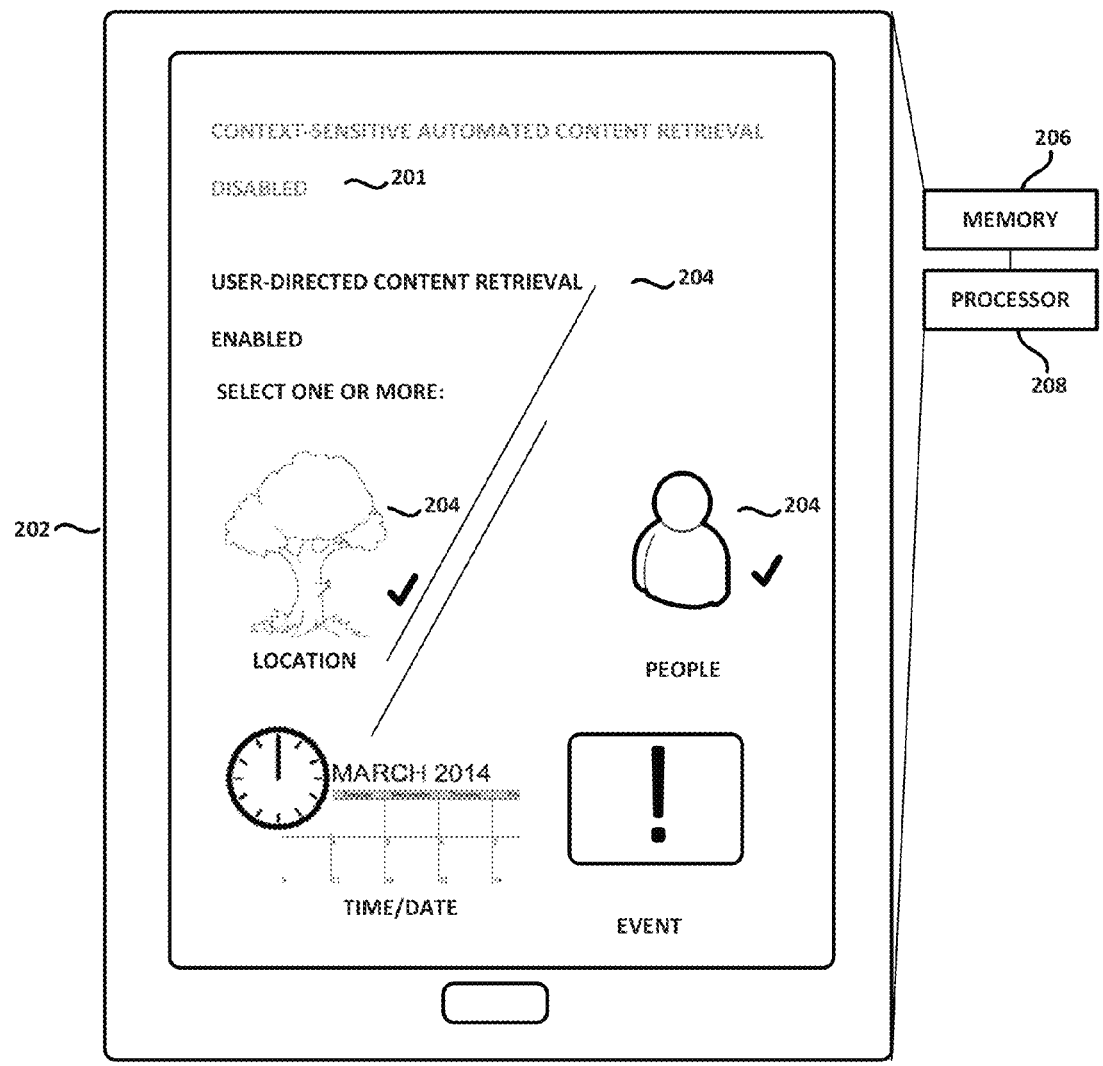
FIG. 2 is a representation of a mobile device and an exemplary user interface configured for the re-discovery of past data, according to one embodiment.

FIG. 2 is a representation of a mobile device and an exemplary user interface configured for the re-discovery of past data, according to one embodiment. As shown, the memory 206 and the processor 208 of mobile device 202 may be configured to enable the functionality shown and described relative to FIG. 2 and/or some or all of the functionality described and shown herein relative to FIGS. 1, 3-5. According to one embodiment, the mobile application and/or the service 102 may automatically define or select from among user-approved contextually-relevant parameters, search user-accessible content (either the user's own or that of other users with whom the user has established a relationship) based upon those parameters and push (or otherwise make available) user-selected content matching those parameters to the user's mobile device 202. Alternatively, the user may be presented, as shown in FIG. 2, with the ability to influence or control the retrieval of user-accessible content through the manual selection of one or more parameters, as suggested at 204. As shown in FIG. 2, the user may disable the present functionality, as shown at 201. If not disabled, the user may be presented with the opportunity to select parameters 204. In the illustrated case, the user has selected parameters 204 "Location" and "People". Using such selection, the service 102 may be configured to search or direct the NAS 104 to search the user-accessible content (the user's own or that of others with whom the user has established a relationship) for content originating from or near the user's current location and containing, for example, pictures, audio content or movies generated by or including the people that are geographically close to user. Such location awareness may make use of Global Position Satellite (GPS) technology, Radio Frequency Identification (RFID) technology, Bluetooth, Near Field Communication (NFC) and/or other techniques to detect people or things that are nearby (e.g., by communicating with their mobile devices). As noted herein, the content retrieved may include content taken at or around the user's current location that originated from people with whom the user has defined a relationship. Further or more detailed user interfaces may be provided to enable a fine-grained control by the user over the parameters that are used to select and retrieve content. Other parameters are possible as shown in FIG. 2, such as time/date and event.

Figure 3:
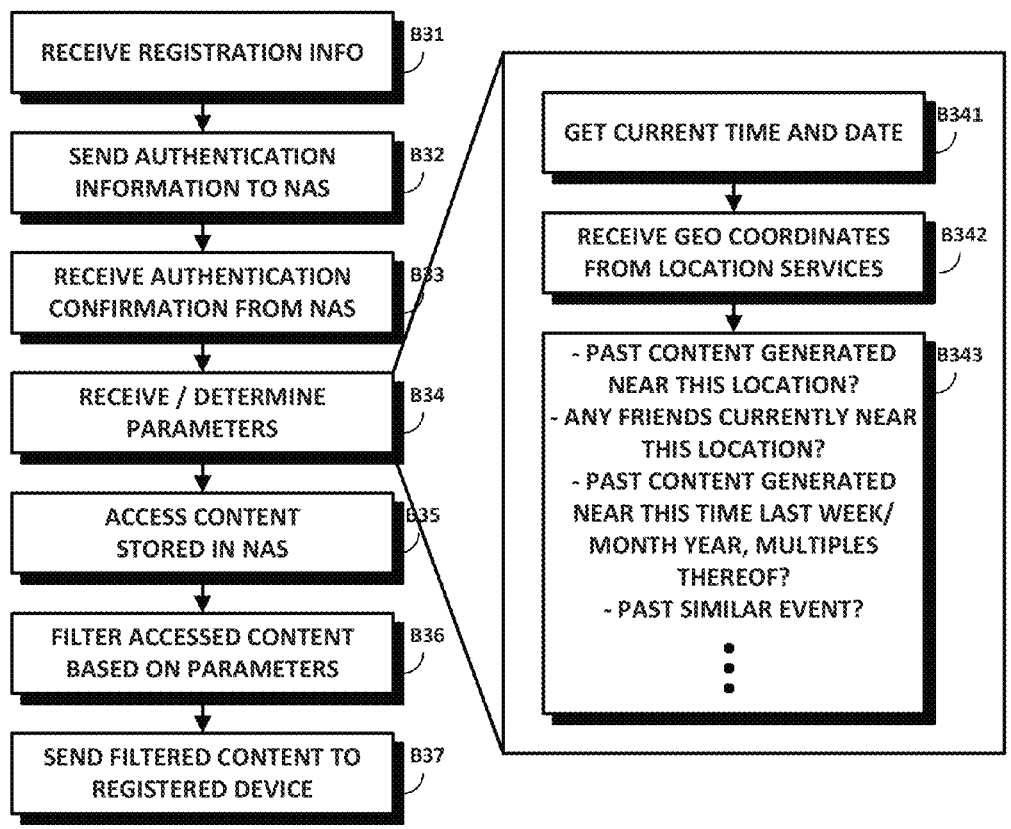
FIG. 3 is a flowchart of one embodiment of a method for the rediscovery of past data, according to one embodiment.

FIG. 3 is a flowchart of one embodiment of a method for the rediscovery of past data, according to one embodiment. The functional blocks of FIG. 3 are from the service 102's point-of-view, as the user registers or logs onto the service 102 to enable the functionality described and shown herein. It is to be understood that the service 102 may also be configured as a distributed service, residing at least in part on user's computing devices, such as mobile device 202, for example. As shown at B31, the user may register or log onto the service 102, which receives the user's authentication credentials. Block B32 calls for the service 102 to send the appropriate authentication information to the user's NAS or carry out whatever steps may be necessary to access the user's NAS and/or the totality or a selected subset of the user-accessible content. Upon receiving authentication confirmation from the NAS or otherwise successfully accessing the user's NAS (or other network-accessible storage) and/or user-accessible content, the service 102 may receive and/or determine one or more parameters to be used to filter and select contextually-relevant user-accessible content or the contextually-relevant shared content of one or more users with whom the user has established a relationship, as called for at Block B34. The parameters may also originate from the user's mobile device and/or the user's NAS 104. For example and as shown at B341 to B343, the parameters received and/or determined may be derived from the current time and date, the current geographic coordinates of the user's mobile device and, for example, past content generated at or near this location, friends (other users with whom the user has previously established a relationship) at or near this location (now or in the past), a similar event or other content previously-generated, whether at or near the current location or not.

For example, parameters may be defined to retrieve content generated two years ago. For example, videos or photos may be presented to the user, with the generated caption "Two years ago today near this location, with Harry and Sally." Content matching such parameters may have originated at the user's NAS, Harry and Sally's NAS, and/or from other network-accessible sources and may be limited geographically, temporally, thematically by event, subject matter and/or any other parameter that may be defined to search through content and/or metadata associated with content to select matching content. Other techniques, such as facial recognition techniques and other feature extraction and media recognition technologies may also be used to further select from the user's past content or from the past content of other users with whom the user has established a relationship in place or in addition to the content's metadata.

It is to be noted that most, if not all of the retrieved and pushed content will likely be highly relevant to the user, on a cognitive and/or emotional level, as he or she views selected, contextually-relevant content from his or her store of content or that of friends and family with whom the user has established the requisite relationship. Indeed, such content may be content with which the user is already familiar (because the user generated the content) or may include content that the user may never have been exposed to previously but that is, nevertheless, highly relevant to the user, his or her present circumstances or for other reasons.

According to one embodiment, some of the user-accessible content, according to one embodiment, may also be retrieved directly from the user's mobile device. Such locally-sourced content may be, for example, interleaved with user-accessible content retrieved from, for example, the user's NAS 104. Content from different devices may be accessed randomly, according to a predetermined schedule or round-robin, for example.

According to one embodiment, as the user moves from one location to the next, as the day progresses, as one day turns into the next, or as others with whom the user has established a relationship join the user or come near the user, as the user participates in recognized events, the parameters used to filter and select the content to present to the user may change accordingly, to ensure the continuous presentation of contextually-relevant content to the user, without any or additional intervention from the user.

Privacy concerns are respected, according to embodiments, as the process may be configured to require positive acts by the user and his or her friends and family to "opt-in" to enable the functionality described and shown herein. Specific files or directories or otherwise-defined logical grouping of content may be marked as "Do Not Share", effectively placing such content outside the purview of the embodiments described herein. The mobile application running on the user's mobile device 202 of FIG. 2 may be configured as a screen saver, for example, displaying the selected content at will, as long as certain conditions are met or upon demand.

Figure 4:
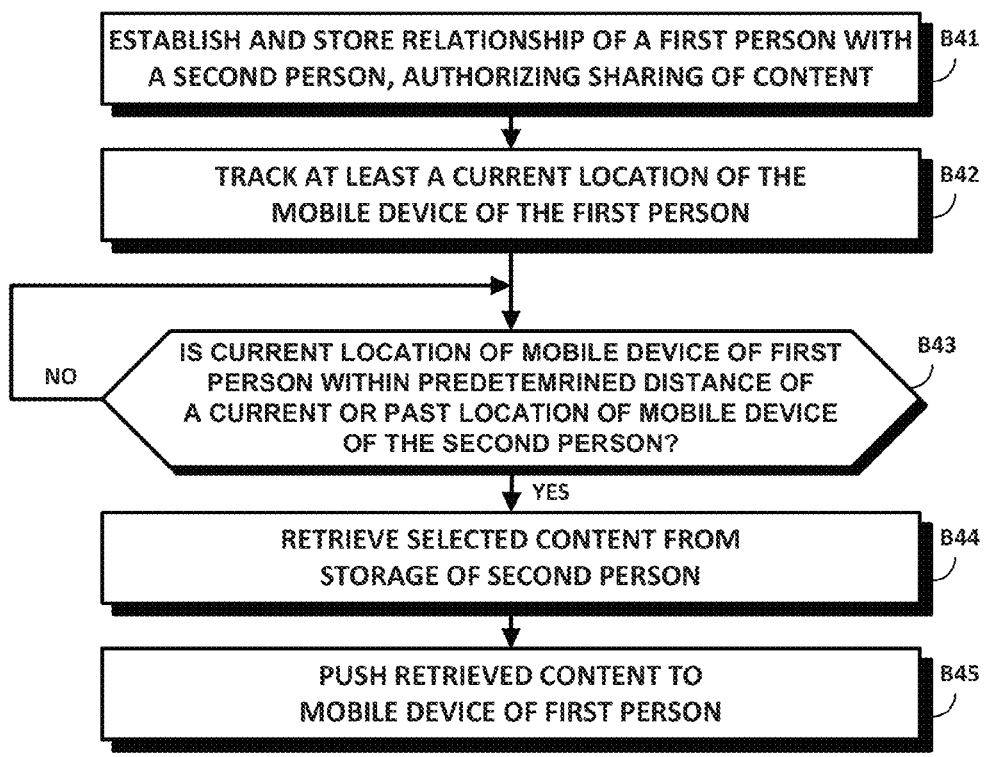
FIG. 4 is a flowchart of one embodiment of a method for the rediscovery of past data, according to one embodiment.

FIG. 4 is a flowchart of one embodiment of a method for the rediscovery of past data, according to one embodiment. As shown therein, block B41 calls for establishing and storing a relationship of a first person with a second person (e.g., a friend, colleague or relative). Such an established relationship, according to one embodiment, may be configured to enable user-configurable selective sharing of content between the first and second persons. Block B42 calls for tracking, for example, the current location of the mobile device of the first person. As shown at B43, when the current location of the mobile device of the first person is within a predetermined distance of a current or past location of the mobile device of the second person (YES branch of B43), actions B44 and B45 may be undertaken. Indeed, as shown at B44, selected content may be retrieved, over a computer network, from the user-accessible storage of the second person. According to one embodiment, such retrieved content may have been previously generated by the second person within the aforementioned predetermined distance of the current location of the mobile device of the first person—whether or not the second person is currently at that location or not. The retrieved content may then be pushed, over the computer network, to the mobile device of the first person, for immediate or deferred rendering.

Figure 5:
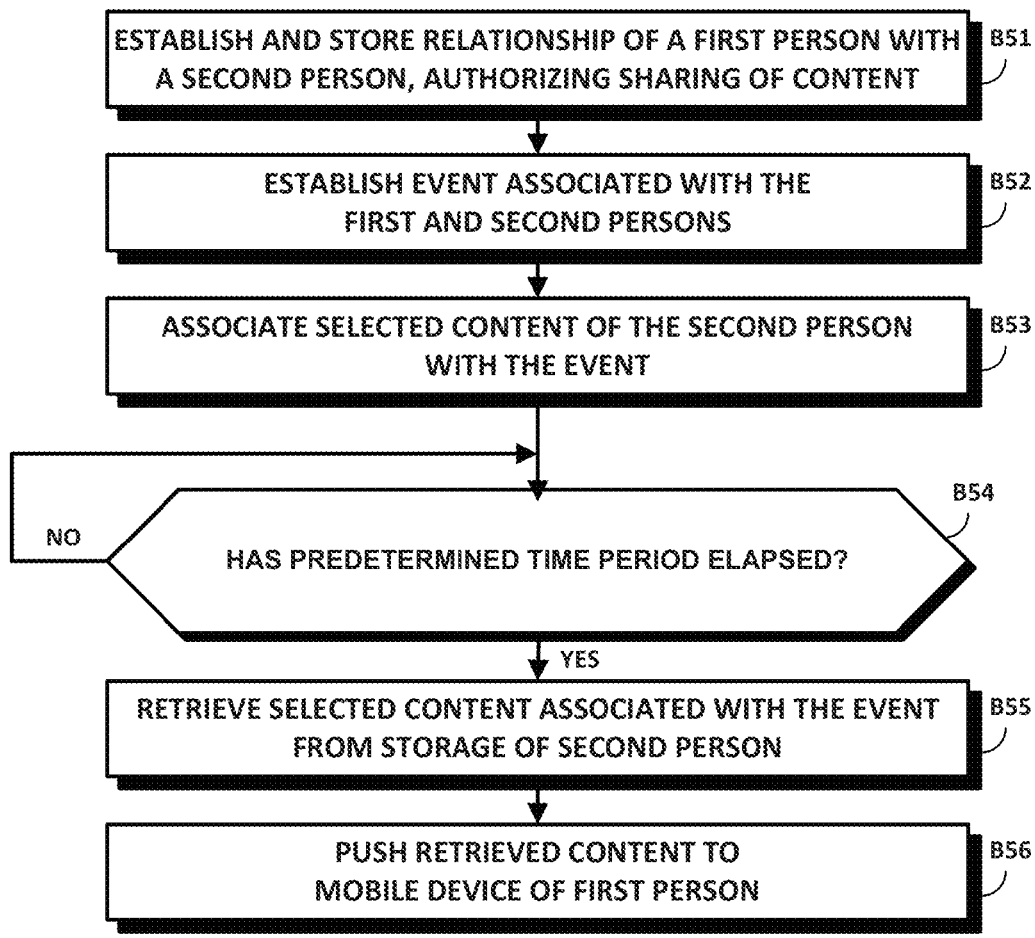
FIG. 5 is a flowchart of one embodiment of a method for the rediscovery of past data, according to one embodiment.

FIG. 5 is a flowchart of one embodiment of a method for the rediscovery of past data, according to one embodiment. As shown, B51 calls for establishing and storing a relationship of a first person with a second person. Herein, the established relationship is configured to authorize the sharing of selected content between the first and second persons. B52 calls for establishing an event associated with the first and second persons. Such an event may be some present or past (or, indeed, future) event in which both the first and the second persons have or will participate in or of which the first and second persons have knowledge. For example, the event may be a sporting event, a Bar Mitzvah, a vacation or any other memorable, significant or otherwise noteworthy event in the first and second persons' lives. Block B53 calls for associating selected content of the second person with the event and B54 for the determination of whether a predetermined time period after the event has elapsed. For example, the predetermined time period may be an anniversary of the event or some other calendar time period (week, month, year, etc.) When the predetermined time period (YES branch of B54) has elapsed, selected content that is associated with the event may be retrieved from the storage of the second person, as shown at block B55. It is to be understood that selected content associated with the event may also be retrieved from the storage (e.g., local or network-accessible) of the first person. As shown at B56, the content retrieved from the storage of the second person may then be pushed to the mobile device of the first person. The pushed content may then be rendered on the mobile device of the first person. The rendering of the pushed content may be carried out in a non-intrusive manner that does not disrupt the use of the mobile device of the first person. Indeed, such pushed content may be stored (even temporarily) by the first person's mobile device for later rendering, when certain operating conditions are met. The content rendered may include the first person's own content that is relevant to the event as well.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A method, comprising:
    establishing a relationship of a first person with a second person, the relationship authorizing sharing of content between the first and second persons;
    storing the established relationship;
    tracking at least a current location of a mobile device of the first person; and
    when the tracked current location of the mobile device of the first person is within a predetermined distance of a current or a past location of a mobile device of the second person:
        retrieving, over a computer network, selected contextually-relevant content from a Network Attached Storage (NAS), coupled to the computer network, of the second person, the contextually-relevant content being selected based upon predetermined selectable parameters and upon pre-established controls that are configured to exclude some unwanted contextually-relevant content that otherwise satisfies the selectable parameters;
        pushing, over the computer network, the retrieved content to the mobile device of the first person; and
        rendering the pushed content on the mobile device of the first person.

2. The method of claim 1, wherein a Direct Attached Storage (DAS) device is coupled to the NAS.

3. The method of claim 1, wherein the retrieved content comprises at least one of audio content, video content and pictures.

4. The method of claim 1, wherein retrieving comprises retrieving only the selected content from the NAS of the second person that has been authorized by the second person.

5. The method of claim 1, wherein the retrieved content comprises content that includes the second person.

6. The method of claim 1, wherein the retrieved content comprises content generated by the second person within a predetermined distance of the current location of the mobile device of the first person.

7. The method of claim 1, further comprising:
    establishing, at a request of the first person, a relationship with a third person; and
    storing the relationship with the third person.

8. The method of claim 1, further comprising:
    retrieving metadata along with the selected content; and
    pushing the retrieved metadata to the mobile device of the first person.

9. The method of claim 8, wherein the metadata includes a date and time at which the retrieved content was generated.

10. The method of claim 1, further comprising:
    selectively retrieving content associated with an event that is relevant to the first person from the NAS of the second person; and
    pushing the retrieved content associated with the event to the mobile device of the first person.

11. The method of claim 1, wherein the established relationship is stored remotely from the mobile devices of the first and second persons.

12. The method of claim 1, further comprising:
    retrieving selected contextually-relevant content from a storage of the first person; and
    rendering the retrieved content on the mobile device of the first person.

13. A method, comprising:
    establishing a relationship of a first person with a second person, the relationship authorizing sharing of selected content between the first and second persons;
    storing the established relationship;
    establishing an event associated with the first and second persons;
    associating selected content of the second person with the event; and
    when at least a predetermined time period associated with the event has elapsed:
        retrieving, over a computer network, selected content that is associated with the event from a Network Attached Storage (NAS), coupled to the computer network, of the second person, the content that is selected for retrieval being based upon predetermined selectable parameters and upon pre-established controls that are configured to exclude some unwanted content that otherwise satisfies the selectable parameters;
        pushing, over the computer network, the retrieved content to the mobile device of the first person; and
        rendering the pushed content on the mobile device of the first person.

14. The method of claim 13, wherein the predetermined time period comprises one of an anniversary, a week, a month and a year.

15. The method of claim 13, further comprising storing information relating to the event and wherein retrieving and pushing are performed with reference to the stored information.

16. The method of claim 15, wherein the information includes at least one of time of the event, date of the event, participants in the event, season of the event, nature of the event and duration of the event.

17. The method of claim 13, further comprising:
retrieving selected content that is associated with the event from a storage of the first person; and
rendering the retrieved content on the mobile device of the first person.

18. A mobile device of a first person having established and registered a relationship with a second person, comprising:
a processor; and
memory coupled to the processor, the memory being configured to store sequences of instructions which, when executed, cause the processor to:
enable at least a current location of the mobile device to be tracked; and
when the tracked current location of the mobile device of the first person is within a predetermined distance of a current or a past location of a mobile device of the second person:
receive, over a computer network, selected content from a Network Attached Storage (NAS), coupled to the computer network, of the second person, the content being selected based upon predetermined selectable parameters and upon pre-established controls that are configured to exclude some unwanted content that otherwise satisfies the selectable parameters; and
render the received content on the mobile device of the first person.

19. The mobile device of claim 18, wherein:
an event is associated with the first and second persons;
the selected content is associated with the event; and
the predetermined selectable parameters comprise a determination that a predetermined time period associated with the event has elapsed.

20. The mobile device of claim 18, wherein the selected content is contextually relevant to the first person, relative to at least one of time, place and circumstances.

21. The mobile device of claim 18, wherein a Direct Attached Storage (DAS) device is coupled to the NAS.

22. The mobile device of claim 18, wherein the selected content comprises at least one of audio content, video content and pictures.

23. The mobile device of claim 18, wherein the selected content comprises metadata.

\* \* \* \* \*